United States Patent Office 3,238,281
Patented Mar. 1, 1966

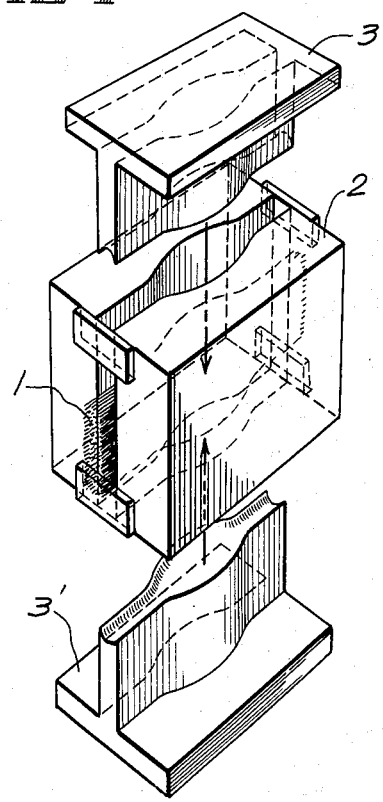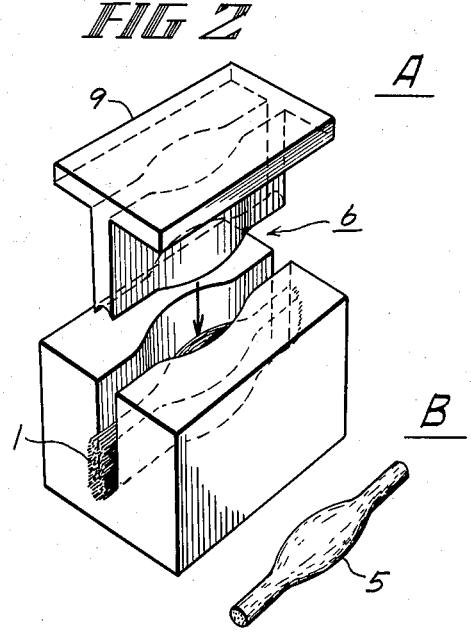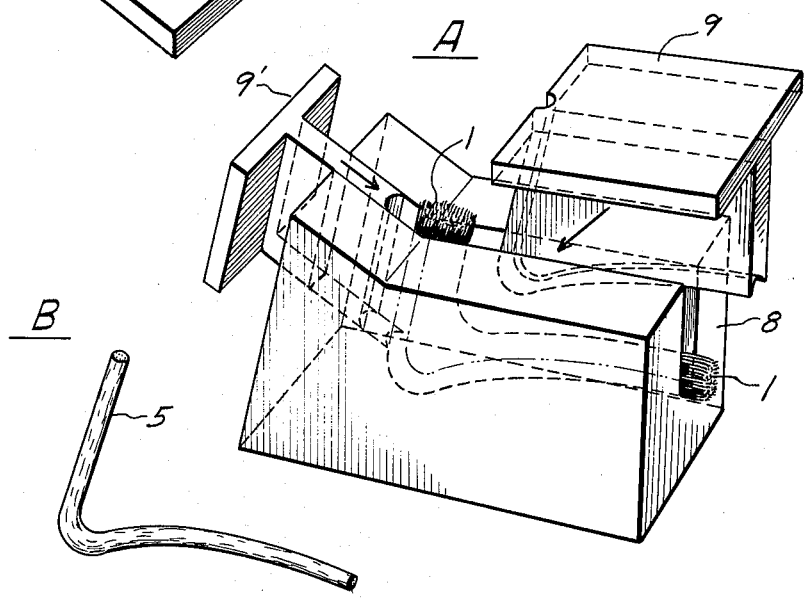

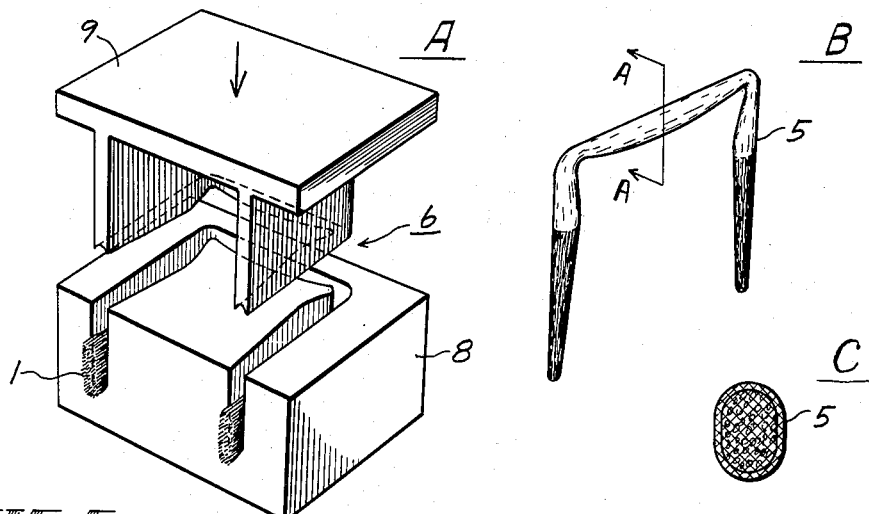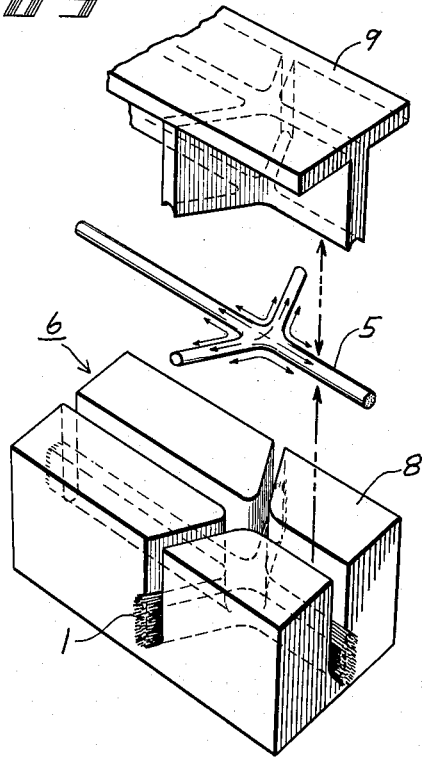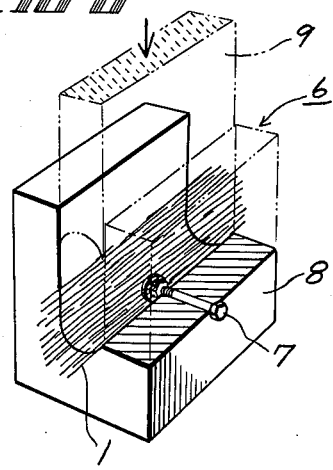

3,238,281
PRODUCTION OF MOLDED WOODEN ARTICLES OF ANY DESIRED SHAPE AND THREE DIMENSIONS FROM THE AGGREGATED WOOD FIBERS
Kiyosi Kato, 7 7-chome, Higashi-Nakadori Tsukishima Chuo-ku, Tokyo, Japan
Filed Mar. 11, 1963, Ser. No. 264,396
Claims priority, application Japan, Mar. 15, 1962, 37/10,234
4 Claims. (Cl. 264—109)

The present invention relates to molded wooden articles, and more particularly, to a method for the manufacture of molded wooden articles of any desired shape and three dimensions from the aggregated wood fibers.

Heretofore the manufacture of curved or tortuous wooden members for furniture and structural uses has been carried out by subjecting a wood material to either bending by heat softening or planing or carving it; and further, the wood joining work in order to manufacture a T-form or Z-form member has been done by means of nailing, dovetailing or dowelling, and an adhesive bonding. However, the cost of labor and material therefore has been high, and besides, the wooden articles thus manufactured have a relatively inferior resistance to strain and moisture. Thus, the conventional curved or tortuous members of wood adapted for the modern stream-lined furniture have been unsatisfactory.

Moreover, in the application of fresh timber for the use of furniture, there are several disadvantages that drying of timber for an extended period of time is required so as to remove moisture therefrom thoroughly to its utmost core, and, to this end, it is necessary to keep considerable quantity of wood material during that period. Besides, in the forming of wood into any desired shape, the shape is limited by the thickness of the wood, and in the bending of several laminated sheets at once, it is very difficult to bend them into a direction parallel with the plane of a single sheet. When a wood working machine tool, such as, wood lathe, is used to work wood, a uniform and accurate wooden article is obtained. However, in working wood by lathe, a careful inspection of wood material is not only necessary, but also there are some disadvantages, such as, occurrence of large amounts of waste chips and turnings, and difficulty of uniform quality by manual labor. Such is the present state of things in the wood craft industry.

The present invention contemplates to overcome the above-mentioned disadvantages, and briefly stated, a preferred embodiment of the invention comprises the steps of producing a number of long narrow chips of flexible wood mechanically disintegrated along the direction of wood fibers of timber, applying an adhesive composition to them uniformly, drying them, and introducing an aggregated mass of dried flexible wood chips into a mold of any desired shape, and molding a wooden article under the condition of heat and pressure. Another preferred embodiment of the invention is directed to a method for the manufacture of a molded wooden article of any desired shape and three dimensions from an aggregated mass of wood fibers by providing any curved or tortuous surfaces, different surface patterns, embedded bolts, or embedded iron reinforcements thereon or therein.

This invention is directed to the use of the wooden material, the disadvantages of which has been overcome by the invention. By this invention, the formation of wood into a desired shape is effected by molding it into a metallic mold so that the mass production of a wooden article, which has been heretofore unable to attain, is feasible. Furthermore, not only diverse wooden members of a curved or furcate form of two or three dimensions are obtained, but also the wooden joint of prior art is formed into an integral unit. A bolt can also be embedded in the wooden article when it is molded. Besides, a steel reinforcement can be embedded in the molded wooden article where a strong strain is imparted in order to overcome the weakness encountered with the wooden joint of prior art.

Compared to the molding process of the present invention for the manufacture of molded wooden articles of any desired shape and three dimensions from the aggregated wood fibers, the conventional manufacturing method has the disadvantages as follows: in the use of natural wood, the yield of a good wood material is considerably low with the result that the cost of the wood material suitable for the manufacture of furniture is exceedingly high; a large wood material should be left as it is for an extended period of time, say, at least one whole year; bending of wood will be limited to some degree; the appearance of variegated surface patterns on the wooden articles is effected by means of an adhesive; the conventional wooden articles are low resistant to moisture; in the manufacture of a T-form or Z-form, some means of wood joint is necessary so that the mass production for a uniform quality article is impossible; in the assembly of a wooden article, it is necessary to make a dovetail or dowel and insert a lug or boss made of wood, synthetic plastic, bamboo or metal into it; and the thus finished article is not only expensive in its manufacturing and material cost, but also relatively weak in strain and moisture.

However, the present invention has the following features: the raw material consists of an aggregated mass of of long slender wooden chips, so a bad part, such as, knots of the wood material can be removed, suitable chips can be easily collected, a quick and complete drying is possible, an artificial drying is also feasible, the mass of slender chips can be molded into an aggregated mass having the particles in its section of any desired shape by means of the adhesive in a measuring mold; in molding the mass of slender chips, any shape, such as, curved surface and twist, is realized; and the molded wooden article having a novel pattern of artificial wood grains heretofore unable to achieve can be produced by providing a different wood material around the aggregated mass of slender chips in the mold and molding it under the heat and pressure.

Furthermore, in the manufacture of an aggregated mass of either bifurcated or trifurcated form by the molding process of the invention, a metal reinforcement, such as, steel is embedded in the aggregated mass while a mass of particularly long slender chips of wood is applied in the furcated part, then the whole mass of assembly is subjected to the molding step under the pressure and heat. The wooden articles thus molded of a T-form, Z-form, Y-form or cross-form of two or three dimensions are far superior to any articles of prior art in uniformity and strength.

It is, therefore, an object of the invention to provide a method for the manufacture of molded wooden articles of any desired shape and three dimensions from the aggregated mass of wood fibers.

It is another object of the invention to provide a novel method for the manufacture of a wooden article of grace, high strength, light weight and moisture resistance in which a difficult wood working step is facilitated as easily as a molten metal, fluidized cement or molten plastic material is molded.

It is still another object of the invention to provide a novel process for the manufacture of molded wooden articles of uniform quality in the form of an integral unit from the material heretofore considered as scrap and waste added with the bonding agent as well as the reinforcement and a bolt and nut.

It is still another object of the invention to provide a novel process for the manufacture of wooden articles of excellent quality, yet of low cost, whereby a form of furniture can be produced by an improved metallic mold.

Numerous other objects and advantages of the invention will be apparent from the following description, which, taken in connection with the accompanying drawings, discloses several preferred embodiments thereof.

In the drawings:

FIG. 1 is a perspective view of a mold for measuring an amount of aggregated mass of wood fibers prior to a molding step under heat and pressure.

FIG. 2–A is a perspective view of a metallic mold by means of heat and pressure.

FIG. 2–B is a perspective view of a wooden article of aggregated fibers molded by the metallic mold.

FIG. 3–A is a perspective view of a metallic mold for molding a curved article.

FIG. 3–B is a perspective view of the curved article molded by the mold of FIG. 3–A.

FIG. 4–A is a perspective view of another metallic mold for manufacturing another curved article.

FIG. 4–B is a perspective view of a wooden article of different surface patterns molded by the mold of FIG. 4–A.

FIG. 4–C is a sectional view of FIG. 4–B taken along the line A—A thereof.

FIG. 5 is a perspective view of a metallic mold for molding an integral unit of furcated construction.

FIG. 6 is a perspective view of a metallic mold for embedding a bolt and nut at the time of molding.

Figure 7:
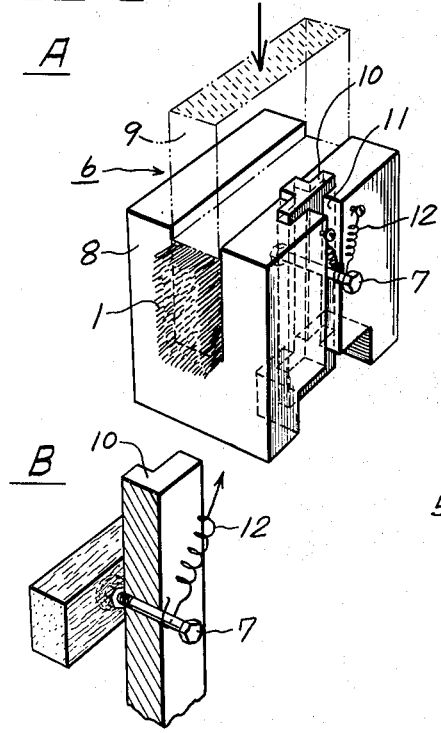

FIG. 7–A is a perspective view of a metallic mold for embedding a bolt and nut.

FIG. 7–B is a perspective view showing a part of FIG. 7–A on an enlarged scale.

Figure 8:
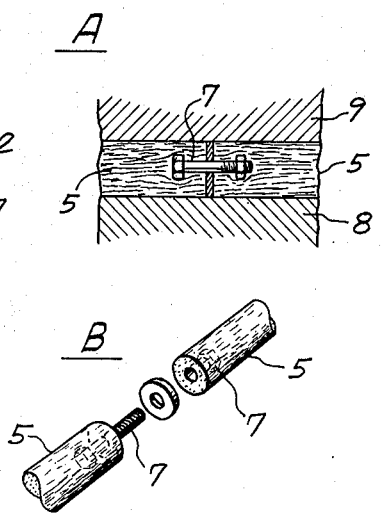

FIG. 8–A is a sectional view of a metallic mold for embedding a bolt and nut into each end of a molded article.

FIG. 8–B is a perspective view of a molded article manufactured by the mold of FIG. 8.

Figure 9:
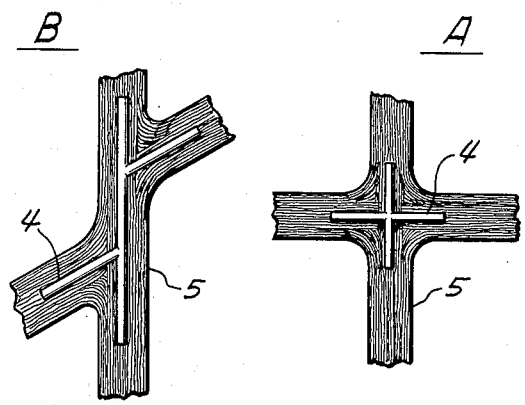

FIG. 9–A and FIG. 9–B are sectional views of molded articles in which steel reinforcements are embedded therein, respectively.

The invention will be described in connection with the accompanying drawings.

The raw material for carrying out the present invention comprises an aggregated mass of long and slender wooden chips of 1–3 mm. in section. This wooden chip is produced by subjecting a timber to slitting and slicing along the direction of wooden fibers of ligneous substance with a section of 1–3 mm. and a suitable length, preferably, 3.3 cm. in length or more. A long, slender and flexible wooden chip thus produced is dried to drying in the order of 3–8%, and this dried wooden chip is adapted for a raw material for this invention. This wooden chip is applied or coated with a liquid adhesive composition selected from the group consisting of epoxy resin, polyester resin, resorcinol resin, melamine resin, phenolic resin, urea resin, vinyl acetate resin, and vinyl chloride resin, and further, added with a suitable solvent therefor. The wooden chip coated with the above adhesive agent is dried to an extent that the moisture content of the adhesive composition is vaporized to an amount of 17–20%. Then, the wooden chip thus treated is coated with an adhesive agent as a preparatory set prior to the molding step by heat and pressure.

As shown in FIG. 5, a number of the above treated wooden chips is introduced into a measuring mold 2. The measuring mold 2 is a mold or container for measuring a predetermined amount or volume of an aggregated mass of wooden chips prior to the molding step by heat and pressure. The predetermined amount of wooden chips is measured by placing a number of chips in the cavity of the mold 2 as if laying a number of bricks and pressing them by means of presser-pieces 3 and 3'.

The application of an adhesive agent to a wooden chip is described hereinbelow. A single sheet scrap of 1.0 mm. thick of lauan is slit into a number of slender flexible wooden chips of 2.0 mm. wide. They are dried in a drying chamber to an extent of drying in the order of 3–8%.

A preferred composition of the adhesive agent suitable for the present invention consists of 100 parts by weight of 67% urea resin available in the market, 3 parts by weight of an organic amine-hydrochloric acid salt, and 30 parts by weight of water. This adhesive agent is applied to the wooden chip uniformly by spraying with a compressed air of 4–8 kg./cm.$^2$. An amount of the adhesive composition is preferred to be one part by weight to 2.00–3.75 parts by weight of the wooden chip material.

In charging and loading a number of wooden chip material into the measuring mold 2, a number of long chip is preferably placed in a curved part of a wooden article to be molded, and a steel reinforcement 4 as shown in FIG. 9–A and B is also preferably embedded together with the number of wooden chips.

In the manufacture of a molded wooden article 5 of different surface patterns as illustrated in FIG. 4–B, a number of different wooden chips of good quality together with some of glass fiber, asbestos fiber, linen, wood wool, bamboo shavings, scrap of single sheet, straw, paper and other various filllers are placed in spaced relation in the measuring mold, and, if desired, a reinforcement material 4 is placed together with the above materials, all of which are coated with a bonding agent all over the surface thereof, in the measuring mold, then the agregated mass of the above materials is transferred into any desired metallic mold, such as, the one as shown in FIG. 2–A, FIG. 3–A, FIG. 4–A, FIG. 5, FIG. 6 or FIG. 7–A, thereafter a molded article 5 as desired is obtained from the molding step under the conditions of heat and pressure.

The molding step is carried out with a pressure of 3–300 kg./cm.$^2$ at a temperature of 110–120° C. for a period of 6–10 minutes to produce a molded wooden article of a high density as well as a high tenacity resulting from a densely solidified mass of wooden chips together with the thermosetting property of the molten adhesive composition.

In the pressure and heat molding step by means of the metallic mold 6, where the parting line is either similar or different as shown in FIG. 1–A, FIG. 4–A and FIG. 5, molding can be carried out by the pressure in one direction. However, in the metallic mold 6 in FIG. 3–A, a plurality of male dies 9 and 9' with the different pressure directions are positioned to one female die 8 and presed together in the directions of an arrow, respectively, by the heat and pressure so that the article thus molded is subjected to a uniform pressure over the entire part thereof.

The article 5 thus molded by heat and pressure is polished by a belt sander to remove the irregular unevenness with the result that a structural or furniture member of high strength free from warp with the longitudinal artifical grains is obtained.

The invention will now be described in connection with the following examples:

*Example 1*

A number of wooden chips coated with the adhesive mentioned hereinbefore and treated as described above is placed in a cavity of the measuring mold almost similar that of the metallic mold according to the direction of the wooden fiber, and a number of particularly long chips is placed in the curved area. The aggregated mass of the above wooden chips placed in the cavity of the measuring mold is subjected to a pressure of 1–2 kg./cm.$^2$ by the pressers above and below to produce an aggregated mass of wooden chips having three times as large as the finished article in section. Then, this raw mass of chips is placed in the cavity of the metallic mold and subjected to the pressure of 160 kg./cm.² by means of two male dies simultaneously in a different direction, respectively, at a temperature of 110–120° C. for a period of 7 minutes.

It has been found that the wooden article thus molded with a bending angle 80 degrees, 35 cm. diameter in section, and 1050 mm. in length has a far superior strength to that of the other ones made by the wood joint or carving.

*Example 2*

A number of lauan chips and other fillers coated with the bonding agent and treated as described in the foregoing are measured by the measuring mold. The fillers include straw and paper, all of which are coated with the bonding agent. The chips of hard wood, such as, oak and cherry, are placed alternately around the above aggregated mass in the measuring mold. This aggregated mass is subjected to a pressure of 1–2 kg./cm.² to obtain a raw material whose section three times as large as that of the finished articles. This raw material is placed in the cavity of the metallic mold in FIG. 4 and subjected to the pressure of 170 kg./cm.² from above at the temperature of 120° C. for a period of 8 minutes. The wooden article thus molded with 23 mm. diameter at each end, 40 mm. diameter at the middle, and 1450 mm. in length has an amazingly novel appearance of an artificial grain entirely different from that of a natural wood.

*Example 3*

A number of wooden chips coated with the bonding composition and treated as described in the foregoing is measured by the measuring mold similar to the metallic mold as shown in FIG. 5. A steel reinforcement similar to a furcated form is embedded in the aggregated mass of wooden chips. The mass thus assembled with the steel reinforcement therein is subjected to a pressure of 1–2 kg./cm.² to produce an aggregated mass whose section three times as large as that of a finished article. This furcated mass is placed in the metallic mold and subjected to the pressure of 150 kg./cm.² at the temperature of 115° C. A furcated wooden article thus molded has been proved to be of a far superior strength to that of the other ones made by manual or machine working from the natural wood.

Some preferred embodiments of the invention as illustrated in FIGS. 6–8 are directed to the molding process in which bolt and nut and other fastening means are embedded in the joint area in order to substitute a nail, a dovetail, and a dowel at the time of molding in accordance with the principle of the invention.

A bolt and nut 7 is embedded in the body of a molded wooden article 5 as shown in FIGS. 6–7A. Referring to FIG. 7, there are a female die 8 and a male die 7, the latter being fixed into the cavity of the former. A slide piece 10 moves along the groove 11 of a cross form provided in the wall of the female die and facilitates the embedding of bolt 7. The slide piece 10 has a spring 12 to impart resilience thereto.

In carrying out the above process for embedding the bolt in the body of a molded article, the bolt and nut is inserted into a hole provided in the slide piece 10 movable in the groove 11 of the wall of the female die 8. The bolt and nut is positioned so as to fix the nut to the bolt, and the slide piece 10 is given resilience by means of the spring 12 installed in a U-form as shown in FIG. 7–A. Then, a number of wood chips coated with the adhesive is placed so as to embed the bolt in the mold and subjected to a molding step by means of the male die 7 from above under heat and pressure. The slide piece 10 having the bolt and nut 7 falls down against the resilience of the spring 12. After the molding step by heat and pressure, the bolt is removed and the nut is embedded in the body 5 of the article.

FIG. 8 is a sectional view showing an embedding process by which bolt and nut are embedded at each end of the molded article 5 at the time of the heat and pressure molding step, a washer 13 being shown.

It will be apparent that various changes may be made in the form, construction and arrangement of the parts without departing from the spirit and scope of the invention, the forms hereinbefore described being merely some preferred embodiments thereof.

I claim:

1. A method of making an axially curved elongated molded wooden article of curved surface construction from an aggregate mass of wooden fibers which comprises the steps of providing flexible wooden chips dried to a moisture content of from between 3 and 8%, the length of each of said chips being at least ten times the width thereof, applying a coating of liquid bonding composition uniformly over the surfaces of said chips, placing a mass of said coated chips in an axially curved elongated measuring mold having a curved molding surface in such a manner that the long dimension of said coated chips is substantially parallel to the curved molding surface of said mold and generally aligned with the axis thereof, subjecting said mass to pressure normal to the long dimension of said chips to produce an axially curved elongated raw mass having a curved molded surface, the cross-sectional area of said raw mass being greater than the article to be manufactured, placing said raw mass in an axially curved metallic mold having a curved molding surface, and subjecting said raw mass within said metallic mold to heat and to pressure normal to said curved molded surface of said raw mass to cure said composition and to reduce the cross sectional area of said raw mass to produce said molded wooden article.

2. A method of making an axially curved elongated molded composite article of curved surface construction from an aggregate mass of wooden fibers and a filler material selected from the group of glass fibers, asbestos fibers, linen, straw and paper, which comprises the steps of providing flexible wooden chips dried to a moisture content of from between 3 and 8%, the length of each of said chips being at least ten time the width thereof, applying a coating of liquid bonding composition uniformly over the surface of said chips and filler material, placing a mass of said coated chips and said coated filler material in an axially curved elongated measuring mold having a curved molding surface in such a manner that the long dimension of said coated chips is substantially parallel to the curved molding surface of said mold and generally aligned with the axis thereof and said coated chips are uniformly distributed about said coated filler and lie adjacent to said molding surface, subjecting said mass to pressure normal to the long dimension of said chips to produce an axially curved elongated raw mass having a curved molded surface, the cross sectional area of said raw mass being greater than the article to be manufactured, placing said raw mass in an axially curved elongated metallic mold having a curved molding surface, and subjecting said raw mass within said metallic mold to heat and to pressure normal to said curved molded surface of said raw mass to cure said composition and reduce the cross sectional area of said raw mass to produce said molded composite article.

3. A method of making a furcated molded wooden article of curved surface construction having a furcated metallic reinforcement which comprises the steps of providing flexible wooden chips dried to a moisture content of from between 3 and 8%, the length of each of said chips being at least ten times the width thereof, applying a coating of liquid bonding composition uniformly over the surfaces of said chips, placing a mass of said coated chips and a furcated metallic reinforcement in a furcated measuring mold having a curved molding surface in such a manner that the long dimension of said coated chips is substantially parallel to said curved molding surface and said coated chips uniformly cover the surface of said reinforcement, subjecting said mass to pressure normal to the long dimension of said chips to produce a furcated raw mass having a curved molded surface, the cross sectional area of said raw mass being greater than the article to be manufactured, placing said raw mass in a furcated metallic mold having a curved molding surface, and subjecting said raw mass within said metallic mold to heat and to pressure normal to the curved molded surface of said raw mass to cure said composition and reduce the cross sectional area of said raw mass to produce said furcated molded wooden article.

4. A method of making an axially curved elongated molded wooden article of curved surface construction having an external fastening means partially embedded therein, which comprises the steps of providing flexible wooden chips dried to a moisture content of from between 3 and 8%, the length of each of said chips being at least ten times the width thereof, applying a coating of liquid bonding composition uniformly over the surfaces of said chips, resiliently supporting an external fastening means within an axially curved measuring mold having a curved molding surface, placing a mass of said coated chips within said mold in such a manner that the long dimension of said coated chips is substantially parallel to the curved molding surface of said mold and generally aligned with the axis thereof and said fastening means is at least partially embedded within said coated chips, subjecting said mass to pressure normal to the long dimension of said chips to produce an axially curved elongated raw mass having a curved molded surface and an external fastening means projecting outwardly therefrom, the cross sectional area of said raw mass being greater than the article to be manufactured, placing said raw mass in an axially curved metallic mold having a curved molding surface and means to resiliently support said fastening means, and subjecting said raw mass to heat and pressure normal to said curved molded surface of said raw mass to cure said composition and reduce the cross sectional area of said raw mass to produce said molded wooden article.

References Cited by the Examiner
UNITED STATES PATENTS

| | | | |
|---|---|---|---|
| 768,304 | 8/1904 | Rivers | 264—109 |
| 1,625,066 | 4/1927 | Viersen | 264—123 |
| 1,663,506 | 3/1928 | Mason | 264—124 XR |
| 1,876,221 | 9/1932 | Grunder | 264—124 XR |
| 2,079,133 | 5/1937 | Taylor. | |
| 2,292,118 | 8/1942 | Guhl | 161—60 |
| 2,311,704 | 2/1943 | Simison. | |
| 2,758,951 | 8/1956 | Case | 161—60 |
| 2,854,372 | 9/1958 | Yan et al. | 264—109 XR |
| 2,876,153 | 3/1959 | Dorland et al. | 264—109 XR |
| 3,014,830 | 12/1961 | Stallard et al. | 264—123 |
| 3,103,254 | 9/1963 | Stedman | 264—109 XR |

FOREIGN PATENTS

| | | |
|---|---|---|
| 885,767 | 9/1943 | France. |

ALEXANDER H. BRODMERKEL, *Primary Examiner.*

P. E. ANDERSON, *Assistant Examiner.*